United States Patent [19]
Ho et al.

[11] Patent Number: 5,779,486
[45] Date of Patent: Jul. 14, 1998

[54] METHODS AND APPARATUS TO ASSESS AND ENHANCE A STUDENT'S UNDERSTANDING IN A SUBJECT

[76] Inventors: Chi Fai Ho, 4816 Cabello Ct., Union City, Calif. 94587; Peter P. Tong, 1807 Limetree La., Mountain View, Calif. 94040

[21] Appl. No.: 618,193

[22] Filed: Mar. 19, 1996

[51] Int. Cl.$^6$ .................................................. G09B 7/04
[52] U.S. Cl. .......................................... 434/353; 434/362
[58] Field of Search .................................. 434/332, 353, 434/362

[56] References Cited

U.S. PATENT DOCUMENTS

| | | | |
|---|---|---|---|
| 5,035,625 | 7/1991 | Munson et al. | 434/332 |
| 5,286,036 | 2/1994 | Barabash | 273/429 |
| 5,597,312 | 1/1997 | Bloom et al. | 434/362 |

OTHER PUBLICATIONS

Interactive Mathematic Instructor's Guide by Academic Systems, pp. 86 and 114. No Date.
High School Learning and Resource Library by ProOne, photocopy of the box and screen–dump to get 5 pages. No Date.
Guide to Selecting Software by PC Novice, vol. 3, Issue 12, pp. 89–92. No Date.
Success Maker Courseware, published by Computer Curriculum Corporation No Date.
Computerized Adaptive Testing, Oct. 24, 1994, from World Wide Web, URL=Gopher://Gopher.ETS.org.
Innovation and Technologies, Oct. 21, 1994, from World Wide Web, URL=Gopher://Gopher.ETS.org.
Selecting Software by PC Novice Series, vol. 3, Issue 12, pp. 51 and 64. No Date.
Logical Journal of the Zoombinis from World Wide Web, URL=http://www.broderbund.com/studio/atoz//zoombini.html. 1996.
Active Mind Series from World Wide Web, URL=http://www.broderbund.com/studio/ams.html 1996.

*Primary Examiner*—William H. Grieb

[57] ABSTRACT

An educational method and system that assess and enhance a student's understanding in a subject. Based on the student's understanding, individually-tailored tests are generated, whose difficulties are geared towards the student's level of understanding in the subject. Thus, the student not only can use the tests to prepare for an examination, but can also use the tests to learn the subject. The system includes a score generator coupled to a recommendation generator. In one preferred embodiment, the recommendation generator includes an inference engine, and in another preferred embodiment, the recommendation generator includes a pre-requisite analyzer. Both the pre-requisite analyzer and the inference engine in the recommendation generator can generate recommendations based on the student's test results. The recommendation generator is coupled to a report generator and a question generator. The report generator accesses a report format. Based on the recommendations and the report format, the report generator generates a report, which can provide assessment of the student's understanding in different areas of the subject, and which can provide action items to improve on the student's understanding in the subject. The question generator, based on the recommendations, generates a number of questions. The student can take this new set of questions to further enhance her understanding in the subject.

55 Claims, 11 Drawing Sheets

| Subject | Major-Topic | Minor-Topic | Line Item | Complexity | Test Score | Time | Over-Score |
|---|---|---|---|---|---|---|---|
| 254 | 256 | 258 | 266 | 268 | 270 | 260 | 272 |

Figure 5

METHODS AND APPARATUS TO ASSESS AND ENHANCE A STUDENT'S UNDERSTANDING IN A SUBJECT

BACKGROUND OF THE INVENTION

The present invention relates generally to education and more particularly to using tests to assess and to enhance a student's understanding in a subject.

The foundation of a vibrant society depends on education. In order to strengthen this foundation, every year the U.S. Government has poured billions of dollars into the educational system. Money has been spent in areas such as laboratory facilities, educational materials, the recruiting of teachers and using computers to enhance our educational system. However, for decades, the way to test a student has remained the same.

Almost all forms of education require testing because testing can assess a student's understanding in a subject. Testing can also serve as an educational aid. For example, one can learn a subject by taking tests if the tests are well designed and if the student can meticulously analyze the solutions to the questions.

For most national tests, such as the Scholastic Achievement Test (SAT), the questions are in the form of multiple choices, and are automatically graded to produce a report. Typically, grading and report generating are computerized. For SAT, the report includes two scores—one indicating a student's mathematics skill, and the other the student's verbal skill. It is impossible to decipher from the two numbers the areas where the student are weak. For example, if his mathematics score is low, it is not clear if that is because he is weak in algebra or geometry or both.

If the student is not satisfied with his scores, he may go for a remedial class. Typically, in such a class, the student takes many tests with many other students. The tests for all the students in the class are the same, because it is very difficult to manually tailor each test to the understanding of each student. After a test, a student compares her test results with her previous results to see if she has improved. Again, the comparison is quite superficial. Usually, the student compares the final grades of the tests—if the recent test score is higher than a previous test score, then she assumes that she has improved. This type of simple feedback on one's performance is not very helpful to the student.

A typical testing process and a typical learning process have a lot of similarities. If a high school student is in an algebra class, the student studies the basic concepts, and then works on a number of assignments, which are the same for all the other students in his class. Again, the questions are not specifically tailored to each student's capability. For a studious student, he would re-work the wrong answers until he gets them correct. However, it is not clear if he has finally understood the concept, or if he has worked on the same assignments so many times that he has either memorized or correctly guessed the answers. These standard assignments lack the feedback that is required to enhance understanding.

It should be apparent from the foregoing that there is still a need for a system and a method to more precisely assess and to enhance a student's understanding in a subject. There is also a need to generate tests that are specifically tailored to a student's weaknesses in the subject, which again would help a student learn. Furthermore, it is desirable that the learning process takes into account the student's past performance to have a better indication of the student's progress in understanding the subject.

SUMMARY OF THE INVENTION

The present invention provides an educational method and system that automatically assess and enhance a student's understanding in a subject. Based on the student's understanding, individually-tailored tests are generated, whose difficulties are geared towards the student's level of understanding in the subject. Thus, the student not only can use the tests to prepare for an examination, but can also use the tests to learn the subject. In one preferred embodiment, the assessment and the enhancement take into account the student's past performance.

In another preferred embodiment, the invented method and system are based on the latest test results from the latest test taken by the student on the subject, which is divided into line-items. In yet another preferred embodiment, at least one line-item is more difficult than another line-item. The latest test includes questions with different line-items.

The invented system includes a score generator coupled to a recommendation generator. In one preferred embodiment, the recommendation generator includes an inference engine, and in another preferred embodiment, the recommendation generator includes a pre-requisite analyzer. The recommendation generator is coupled to a report generator and a question generator.

The score generator preferably accesses the student's prior-to-the-latest test results in the student's test results table, and the latest test results as to generate one overall score for each set of questions that belongs to the same line-item. In one preferred embodiment, the prior-to-the-latest test results are test results from the test immediately before the latest test. In another preferred embodiment, each overall score reflects the student's degree of forgetfulness as a function of time for that group of questions. Based on the calculated overall scores, the score generator updates the student's test results table to include the latest test results.

Both the pre-requisite analyzer and the inference engine in the recommendation generator can generate recommendations based on the student's test results table. The pre-requisite analyzer accesses pre-requisite rules, which, based on the complexity levels of the line items, determines a complexity-hierarchy among the line-items. Then, applying the complexity-hierarchy to the test results table, the pre-requisite analyzer determines the student's level of understanding in the subject to provide recommendations for the student which, for example, suggest the student to work on one line-item.

The inference engine accesses a set of relationship rules that define relationship among the line items and the subject. Then applying the set of relationship rules to the student's test results table, the inference engine determines the student's level of understanding in the subject to provide recommendations for the student.

If there is any conflict among one or more relationship rules with the contents in the test results table, or if there is any conflict among two or more relationship rules, the inference engine resolves it. Resolving such conflicts ensures a consistent assessment of the student's understanding in the subject.

In one preferred embodiment, the report generator accesses a report format. Based on the recommendations and the report format, the report generator generates a report, which can provide assessment of the student's understanding in line-items of the latest test and the prior-to-the-latest tests, and which can provide action items to improve on the student's understanding in the subject.

The question generator, based on the recommendations, generates a number of questions, which, in another preferred embodiment, can be categorized into at least two line items—one being the one suggested by the recommendations, and the other being different from the one suggested by the recommendations. The student can take this new set of questions to further enhance his understanding in the subject.

Other aspects and advantages of the present invention will become apparent from the following detailed description, which, when taken in conjunction with the accompanying drawings, illustrates by way of example the principles of the invention.

BRIEF DESCRIPTION OF THE DRAWINGS

FIG. 5 shows an example of a test results table in the present invention.

Same numerals in FIGS. 1–10 are assigned to similar elements in all the figures. Embodiments of the invention are discussed below with reference to FIGS. 1–10. However, those skilled in the art will readily appreciate that the detailed description given herein with respect to these figures is for explanatory purposes as the invention extends beyond these limited embodiments.

DETAILED DESCRIPTION OF THE INVENTION

In one preferred embodiment, a subject is divided into major-topics, with each major-topic subdivided into minor-topics, and with each minor-topic further subdivided into line-items. For example, the subject is mathematics; it is divided into major-topics, such as high school algebra, which is sub-divided into minor topics, such as integers, which is further sub-divided into line items, such as addition. Each line-item has a number of complexity levels, such as multiplying numbers with two digits is more difficult than multiplying numbers with one digits. Other preferred embodiments can have only the subject and line-items. Another preferred embodiment can have more levels below the line-items.

A student takes a test on the subject. Each question in the test belongs to a line-item, and has a complexity level, which may range from 1 to 9. Consider the line item of addition and subtraction of fractions with common denominator. The degree of complexity of such a question depends, for example, on the number of fractions or terms in the mathematical expression, and the number of digits of the numerator. For example, $\frac{1}{2}+\frac{3}{2}$ is less complex than $\frac{1}{2}+\frac{3}{2}+\frac{7}{2}$ since the latter has more terms; and $\frac{1}{76}+\frac{7}{76}$ is less complex than $\frac{43}{76}+\frac{59}{76}$ since the latter has more digits than the former.

In one preferred embodiment, the latest test taken by the student involves one or more line-items, with questions covering a range of complexity levels, as in a conventional test. In another preferred embodiment, the questions in the latest test belong to the same line-item and are of the same complexity level.

Figure 1:
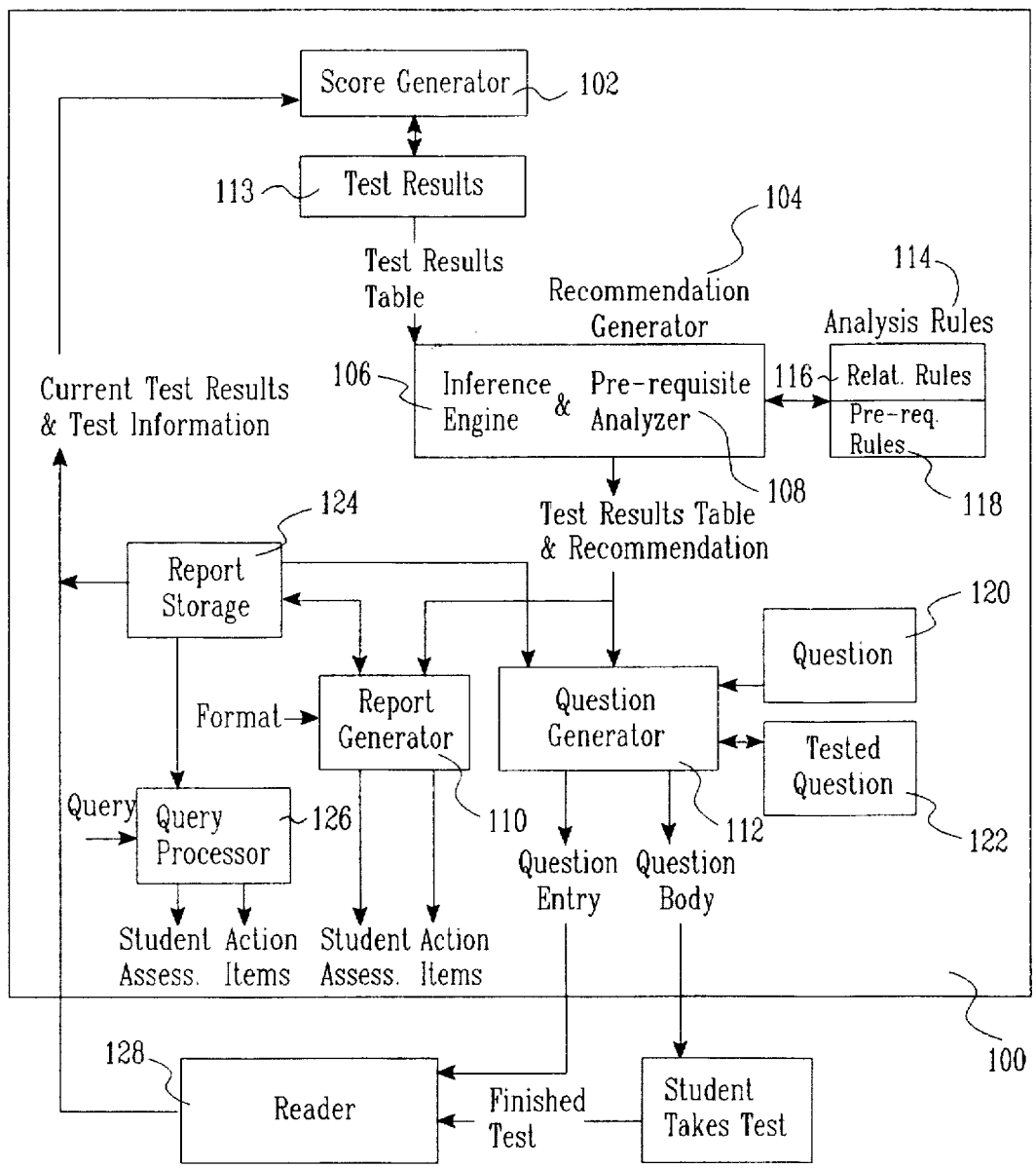
FIG. 1 shows one preferred embodiment of the educational system in the present invention.

FIG. 1 shows one preferred embodiment of the educational system 100 in the present invention. The system includes a number of components, such as a score generator 102 coupled to a recommendation generator 104. The recommendation generator 104 is coupled to a report generator 110 and a question generator 112. The different components within the system does not have to reside in one computer. In another embodiment, the different components in the system are within more than one computing device, and the computing devices can exchange information through a computer network or a storage medium or other means. The storage medium, such as a floppy disk, can be detached from the system. In one preferred embodiment, the system also includes a number of storage media, such as a test-results-storage medium 113, an analysis-rules-storage medium 114, a questions-storage medium 120, a tested-questions-storage medium 122, and a report-storage medium 124, which is coupled to a query processor 126 to query the report-storage medium 124. In another preferred embodiment, one or more of the different storage media are not within the system. In yet another preferred embodiment, the system does not include any one of the above storage media.

Figure 2A:
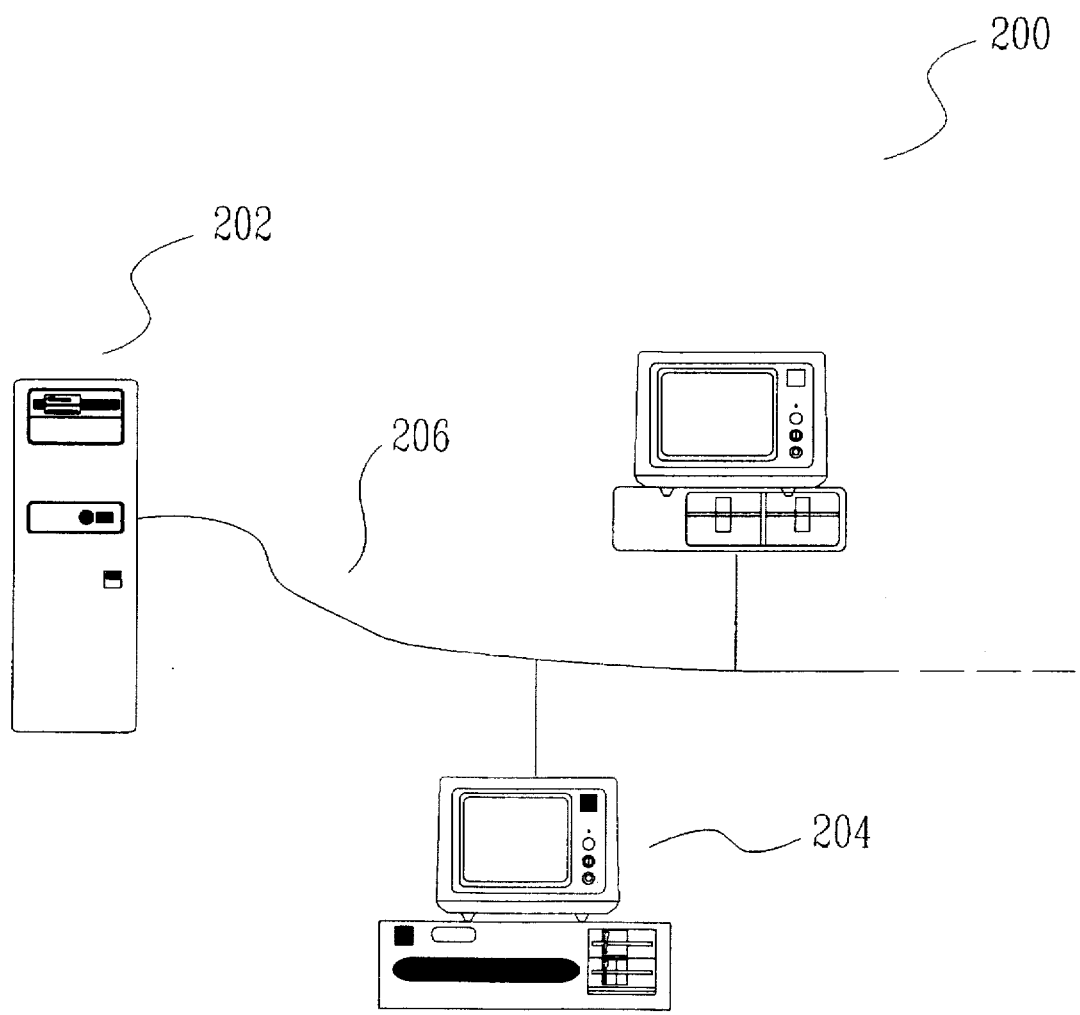
FIGS. 2A–B show an example of a preferred system implementing the present system.
Figure 2B:
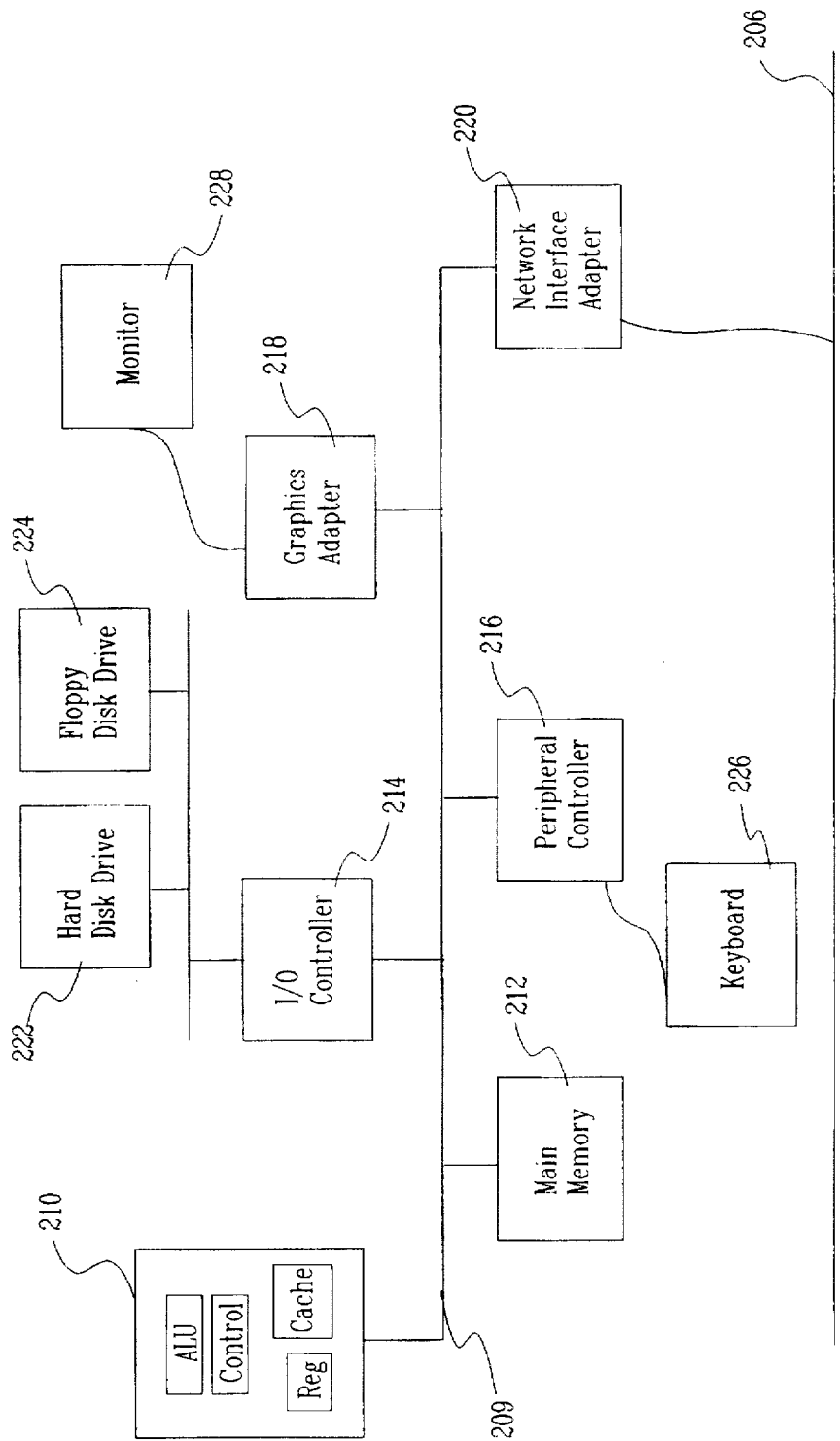

FIG. 2A shows an example of a preferred system implementing the present system, preferably in software. For example, the score generator and the recommendation generator can be in a server computer 202, while the question generator and the report generator can be in a client computer 204. In such an embodiment, the different computers can communicate with each other through a dedicated communication link, or through a computer network 206. FIG. 2B shows the client computer 204, typically including a bus 209 connecting a number of components, such as a processing unit 210, a main memory 212, an I/O controller 214, a peripheral controller 216, a graphics adapter 218 and a network interface adapter 220. The I/O controller 214 is connected to components, such as a harddisk drive 222 and a floppy disk drive 224. The peripheral controller 216 is connected to components, such as a keyboard 226. The graphics adapter 218 is connected to a monitor 228; and the network interface adapter 220 is connected to the network 206.

Score Generator

Figure 3:
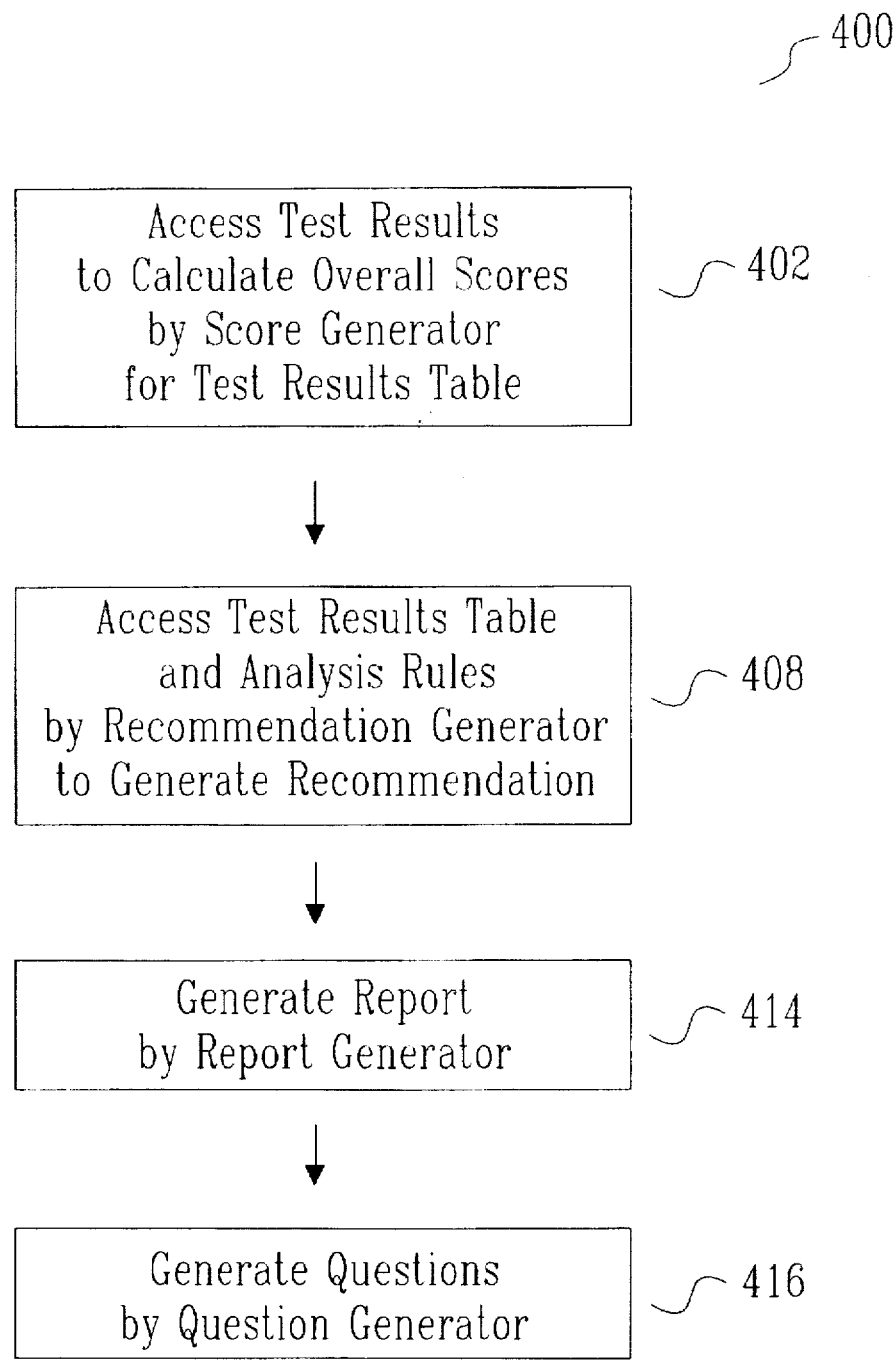
FIG. 3 shows a set of preferred steps to implement the present invention.
Figure 4:
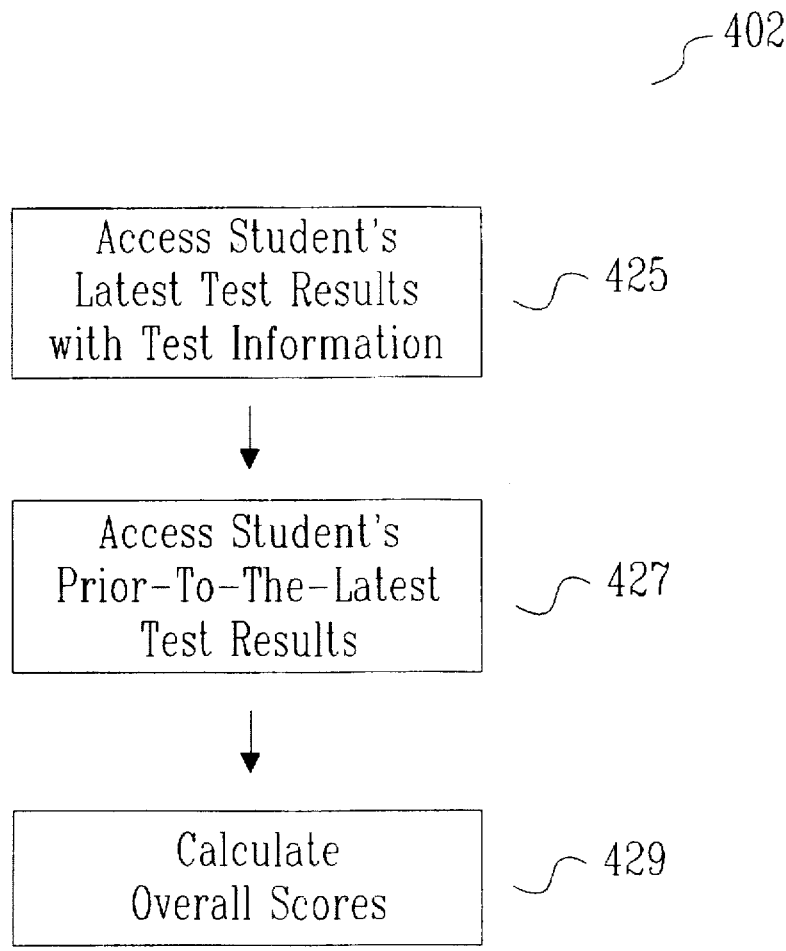
FIG. 4 shows a set of steps to generate overall score in the present invention.

After the student takes a test—the latest test—it is graded. The grading process will be explained later. Assume that the latest test has been graded. FIG. 3 shows a set of preferred steps 400 to implement the present invention. First, the score generator accesses 402 test results to generate overall scores for a test results table. FIG. 4 shows the step of generating overall scores in more detail.

The latest test results with test information are accessed 425 by the score generator 102 and the test-results-storage medium 113, which stores the test results. In one preferred embodiment, the test information includes the student's identity and the time the latest test was taken. Based on the student's identity, the score generator 102 also accesses 427 the student's prior-to-the-latest test results from the test-results-storage medium 113. In another preferred embodiment, the latest test results and the test information are only directly accessed by the score generator 102, which is coupled to the test-results-storage medium 113.

Figure 5:
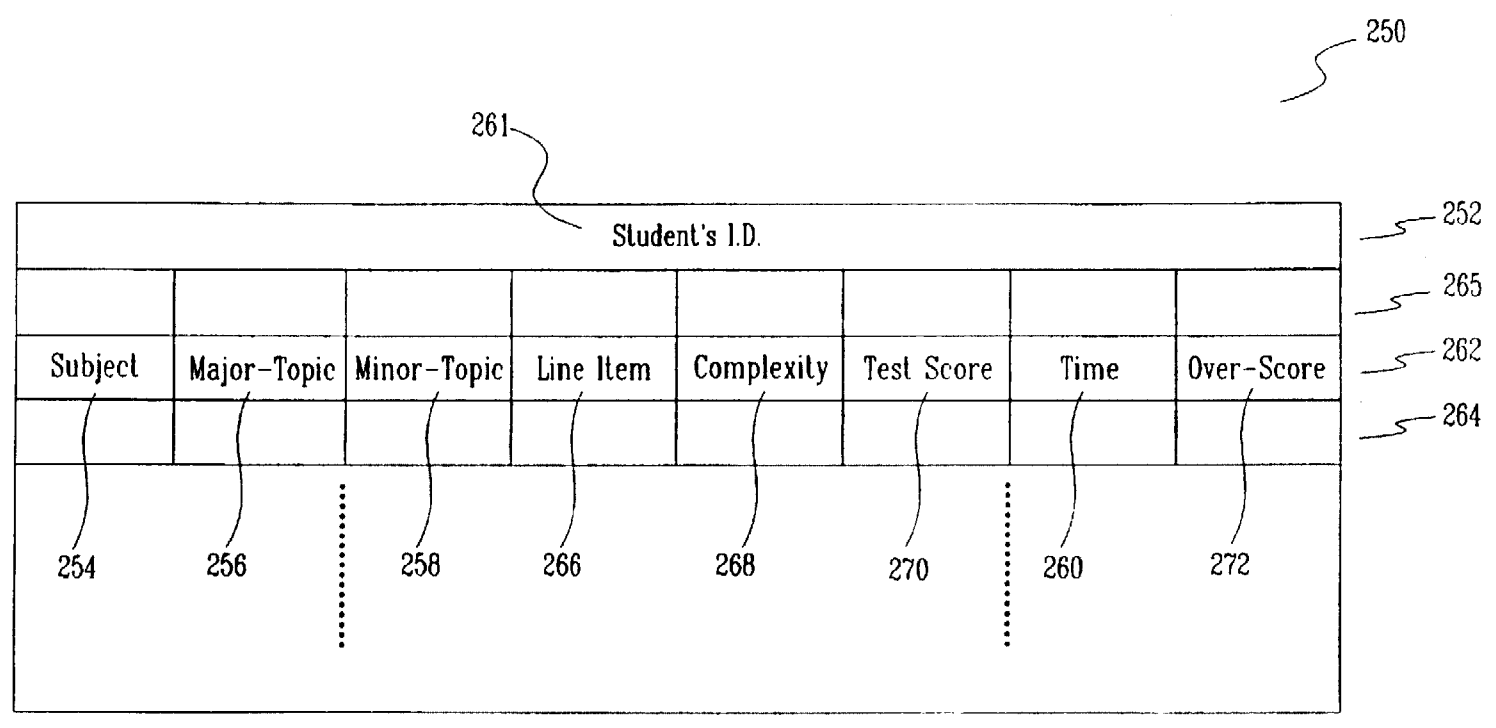

In one preferred embodiment, the prior-to-the-latest test results are in the test results table, which is student-specific. FIG. 5 shows an example of such a table, 250. Preferably, it has a general entry 252, storing the identity of the student who took the test, 261, such as the student's name or social security number.

In one preferred embodiment, the table also includes a number of specific entries, such as 262 and 264. Every time the student takes a test, the score generator creates one or more additional specific entries into the table. Each specific entry, such as the entry 262 for the prior-to-the-latest test results, identifies a set of questions and includes attributes, such as its subject 254, its major-topic 256, its minor-topic 258, its line-item 266, the complexity 268 of the group of questions, the test score 270 for that group of questions, the time the test with that group of questions was taken 260, and an overall score 272, which was calculated 429 by the score generator 102 based on the student's test scores for questions with the same attributes. If the latest test only has questions from one line-item and with one difficulty level, then the table will be increased by one more specific entry.

There are a number of preferred methods for the score generator to calculate the overall score for each entry. One preferred way is to find the average of all test scores with the same attributes from all test results.

Another preferred way to calculate the overall score includes time as a factor to reflect the student's degree of forgetfulness. It has been found that one's degree of forgetfulness typically follows an exponential function—the longer the time elapses, the more one forgets. If a student has taken a SAT years ago, the effect of that test on the learning process should be minimal. One way to represent such an exponential drop is to have the overall score be dependent on a weighted combination of the test score of the latest test and the overall score of the prior-to-the-latest tests. If the weight for the latest score is more than the weight for the prior-to-the-latest overall score, the calculation has the effect of putting more emphasis on the latest test score. The following calculation shows such a representation has an exponential effect:

```
OS(t1)  = S(t1)
        ; For the first test, overall score at t1 = score at t1.
        ; Under this condition, there is no prior-to-the-latest test results
        ; to influence the overall score.
OS(t2)  = 0.6*S(t2) + 0.4*OS(t1)
        = 0.6*S(t2) + 0.4*S(t1)
OS(t3)  = 0.6*S(t3) + 0.4*OS(t2)
        = 0.6*S(t3) + 0.4*0.6*S(t2) + 0.4^2*S(t1)
OS(t4)  = 0.6*S(t4) + 0.4*0.6*S(t3) + 0.4*0.4*0.6*S(t2) + 0.4^3*S(t1)
```

Where t1 is earlier than t2;
  t2 is earlier than t3;
  t3 is earlier than t4;
  OS(x)=Overall Score of a test taken at time x;
  S(x)=The score of a test taken at time x;
  0.4=The weight for the overall score of the prior-to-the-latest tests; and
  0.6=The weight for the overall score of the latest test.

As shown by the above example, the effect of an early test drops exponentially as one takes more tests, which typically implies widening the time gap between the latest test and the early test.

Another way to show an exponential effect is to directly multiply the prior-to-the-latest overall score by a weight, raised to a power that depends on the time between the latest test and the prior-to-the-latest test. An example is shown as follows, with n being the number of weeks between the time the latest test was taken and the time the prior-to-the-latest test was taken:

Overall_score of the latest test =
(1 − 0.6^(n + 1))*latest test score +
0.6^(n + 1)*prior to the latest overall score.

In another preferred embodiment, the weight for the prior-to-the-latest overall score is zero. In this situation, the score generator ignores the prior-to-the-latest overall score, and the overall score of the latest test is just the test score of the latest test. For such an embodiment, the main function of the score generator becomes accessing the latest test results, and then passing them on to the recommendation generator.

After the overall-score for a group of questions with the same line-item and difficulty level is calculated, a specific entry is created, such as 265, to update the test results table. The updated test results table is stored in the test-results-storage medium. If in the future, the student takes another test with the same line-item and difficulty level as in 265, when the score generator 102 is searching for the prior-to-the-latest overall score, the generator 102 searches for the most recently calculated overall scores. This means that the overall score in 265 becomes the prior-to-the-latest overall score to be used to calculate the new overall-score.

Recommendation Generator

In one preferred embodiment, the recommendation generator 104 accesses 408 the test results table and a set of analysis rules to generate recommendations for the student. The test results table is accessed from the test-results-storage medium. In another preferred embodiment, the recommendation generator 104 directly accesses the table from the score generator.

In one preferred embodiment, the recommendation generator includes an inference engine 106; in another preferred embodiment, the recommendation generator 104 includes a pre-requisite analyzer 108. In yet another preferred embodiment, the recommendation generator 104 includes both the inference engine 106 and the pre-requisite analyzer 108.

The recommendation generator 104 is coupled to the analysis-rule-storage medium 114, which stores a set of subject-specific analysis rules. For the embodiment with the inference engine 106, the analysis rules include a set of relationship rules 116. For the embodiment with the pre-requisite analyzer, the analysis rules include a set of pre-requisite rules 118.

Inference Engine

Figure 6:
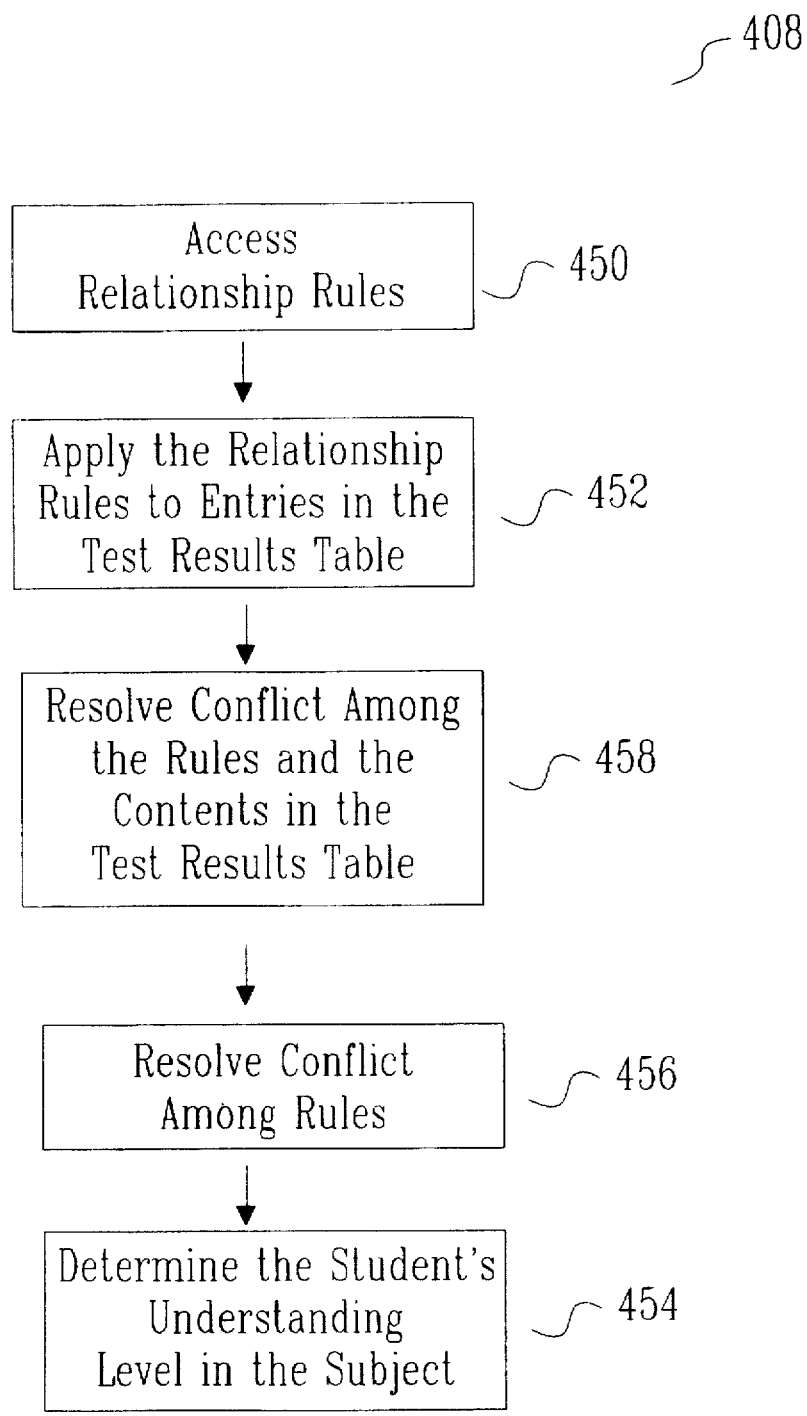
FIG. 6 shows one preferred embodiment of the inference engine generating recommendation for the student in the present invention.

FIG. 6 shows one preferred embodiment of the inference engine 106 generating recommendation for the student. First, the engine accesses 450 the set of relationship rules from the analysis-rule-storage medium. These rules define the relationship among different areas in the subject, such as the relationship among the line-items, the minor-topics, the major-topics and the subject. Then the inference engine applies 452 the relationship rules 116 to entries in the test results table 250 to determine 454 the student's understanding level in the subject. In one preferred embodiment, each relationship rule is of the following format:

(consequence, condition1, condition2, . . . ).

If all the conditions are satisfied, the consequence is true. If any one of the conditions is not satisfied, the consequence is false.

These rules can be used in many different preferred ways. One preferred way is an if-then-else statement within a program, such as:

```
If the overall-score of a line-item (such as integer addition/subtraction or
int +/-) at
a specific complexity level > 90 then grade: = A
else if overall-score > 75 then grade: = B
else if overall-score > 60 then grade: = C
else if overall-score > 50 then grade: = D
else grade: = F.
If the grade of (Int +/-) = A and
the grade of(Int *,/) = A and
the grade of (Int Factorization) = A and
the grade of (Int common divisor) is better than or equal to B
then the grade of Int: = A.
```

In the above examples, the symbol ":=" denotes an assignment operator; also a grade is similar to a student's mastery level in that item. In another preferred embodiment, a grade is transformed to a description in terms of mastery level, such as weak or strong in that item.

In one preferred embodiment, the relationship rules also determine a number of factors, such as (1) the grade in each line-item of a minor-topic before one is considered strong in that minor-topic; (2) the grade in each minor-topic of a major-topic before one is considered strong in that major-topic; and (3) the grades in each major-topic of the subject before one is considered strong in that subject. Based on the relationship rules, the inference engine can infer not only how well the student performs in a specific complexity level of a line-item, but also how well the student performs in a minor-topic, or a major-topic, or even the subject itself.

In another preferred embodiment, each relationship rule is represented in a table of attributes with one attribute being the consequence and the others conditions. As an example, for the line-item at the specified difficulty level, the grades or consequence and the conditions at that difficulty level are:

| Grade/Consequence | Condition |
|---|---|
| A | Overall score of the line item > 90 |
| B | 90 > = Overall score of the line item > 75 |
| C | 75 > = Overall score of the line item > 60 |
| D | 60 > = Overall score of the line item > 50 |
| F | Overall score of the line item < = 50 |

| Consequence | Condition |
|---|---|
| G(Int +/-): = A | G(Int +/-) at level 8 = A. |
| G(Int): = A | G(Int +/-) = A, G(Int *,/) = A, G(Int factorization) = A, G (Int common divisor) is better than or equal to B. |

In the above example, the term "G" denotes "the grade of."

In yet another preferred embodiment, the relationship rule is represented by a set of Horn's clauses in a logic programming language, such as prolog. For example,

```
G(Int +/-) is A if Overall-score (Int +/-) > 90
G(Int +/-) is, B if 90 > = Overall-score (Int +/-) > 75
G(Int +/-) is C if 75 > = Overall-score (Int +/-) > 60
G(Int +/-) is D if 60 > = Overall-score (Int +/-) > 50
G(Int +/-) is F if Overall-score (Int +/-) < = 50
G(Int) is A     if G(Int +/-) is A
                and G(Int *,/) is A
                and G(Int factorization) is A
                and G(Int Common Division) is better than B.
```

-continued

```
G(Int) is A    if G(Int +/-) is A
               and G(Int *,/) is A
               and G(Int factorization) is A
               and G(Int Common Division) is B.
```

Some examples of relationship rules describing the relationship among different line-items, or minor-topics or major-topics are as follows:

Weak in algebra implies weak in geometry;

Weak in integers implies weak in fraction;

Weak in algebra implies weak in trigonometry; and

Weak in geometry implies weak in analytic geometry.

Typically, relationship rules are based on expert knowledge on general relationship among different areas in a subject. The way to generate the rules to form the relationships should be well known to experts in the subject—the more knowledgeable the expert, the more complete the set of rules.

In the above examples, the inference engine operates on the test results table to generate 412 recommendations. In one preferred embodiment, the engine operates on the latest overall-scores and the prior-to-the-latest overall scores. For example, one latest overall score indicates that the student is very proficient in fractional +/- without common denominator, and one prior-to-the-latest overall score indicates that the student is very proficient in fractional *,/with integer. Based on the two overall scores, the inference engine can provide a recommendation that the student should work on fractional *,/ without common denominator.

Note that the present invention does not require the student to take many tests. If the student has not done enough questions, then the inference engine would indicate that she has only reached a certain state, such as passing only a minor-topic, not a major-topic of a subject.

In one preferred embodiment, the inference engine can resolve 456 relationship rules that are in conflict, or are not fully consistent. For example, Rule 1: If a student is weak in algebra, then the student is weak in geometry.

Rule 2: If a student is weak in geometry, then the student is weak in trigonometry.

The inference engine, based on rules 1 and 2, derives Rule 3:

Rule 3: If a student is weak in algebra, the student must be weak in trigonometry. Conversely, if a student is strong in trigonometry, the student must be strong in algebra.

Rule 4: A student strong in trigonometry may not be strong in algebra.

The derived rule 3 is in conflict with rule 4. Then, the inference engine derives and adds the following rule as one of the relationship rules:

Rule 5: If a student is strong in trigonometry, but there is no data, latest or prior-to-the-latest, to show the student's ability in algebra, the student should work on algebra next. In the future, this new rule takes precedence over the conflicting rules. With rule 5 applied before rules 1 and 2, the system will not derive rule 3. Another way to resolve the conflict is to reshuffle the order of application of the rules. For the above example, one way to resolve the conflict between rule 4 and rule 3 is to apply rule 4 before applying rules 1 and 2.

In another preferred embodiment, the inference engine can resolve 458 one or more relationship rules in conflict with the contents in the test results table, such as the overall scores. In one preferred embodiment, rules in conflict are disabled. For example, with the above rule 1 to rule 3 still active:

> The student's overall scores indicate that the student is strong in trigonometry, but weak in algebra. Such scores are in conflict with rule 3. Under such a situation, the inference engine would disable rule 1 for this student. Without rule 1, the engine will not be able to derive rule 3, and there will be no rules in conflict with the overall scores.

Reshuffling the rules, such as rules 1, 2 and 4 above, can also resolve the conflict among the rules and the contents in the test results table, such as the overall scores.

Another preferred way to resolve conflicts is to associate a credit with each rule. The credit is advanced by a certain amount if its corresponding rule is used to generate a recommendation. However, the credit of a rule is decremented by another amount if the rule is found to be in conflict with another rule or with the contents in the test results table. In one preferred embodiment, the increment and the decrement amount are the same. In another preferred embodiment, either the increment or the decrement amount is zero. The order of application of rules is based on the credits of the rules—a rule with a larger credit is applied before a rule with a smaller credit.

Yet another preferred approach to resolve a conflict with the contents in the test results table is to add a new rule, which has precedence over non-new rules. Based on the above example, to prevent conflict with rules 1-3, the following new rule is added:

> If a student is strong in trigonometry, but weak in algebra, the student should work on algebra.

In a number of the above situations, the modified rules or credits are preferably stored in the analysis-rule-storage medium. In case when the change in rules is student-specific, the student's identity is also stored with the corresponding rules. One preferred method to accommodate the modified or student-specific rules is to store all such rules in the analysis-rule-storage medium. When the recommendation analyzer accesses rules from the analysis-rule-storage medium, it retrieves all the unmodified or generic rules and the modified or student-specific rules. If a generic rule has a student-specific version, the student-specific rule is used instead of the generic rule.

Pre-Requisite Analysis

Figure 7:
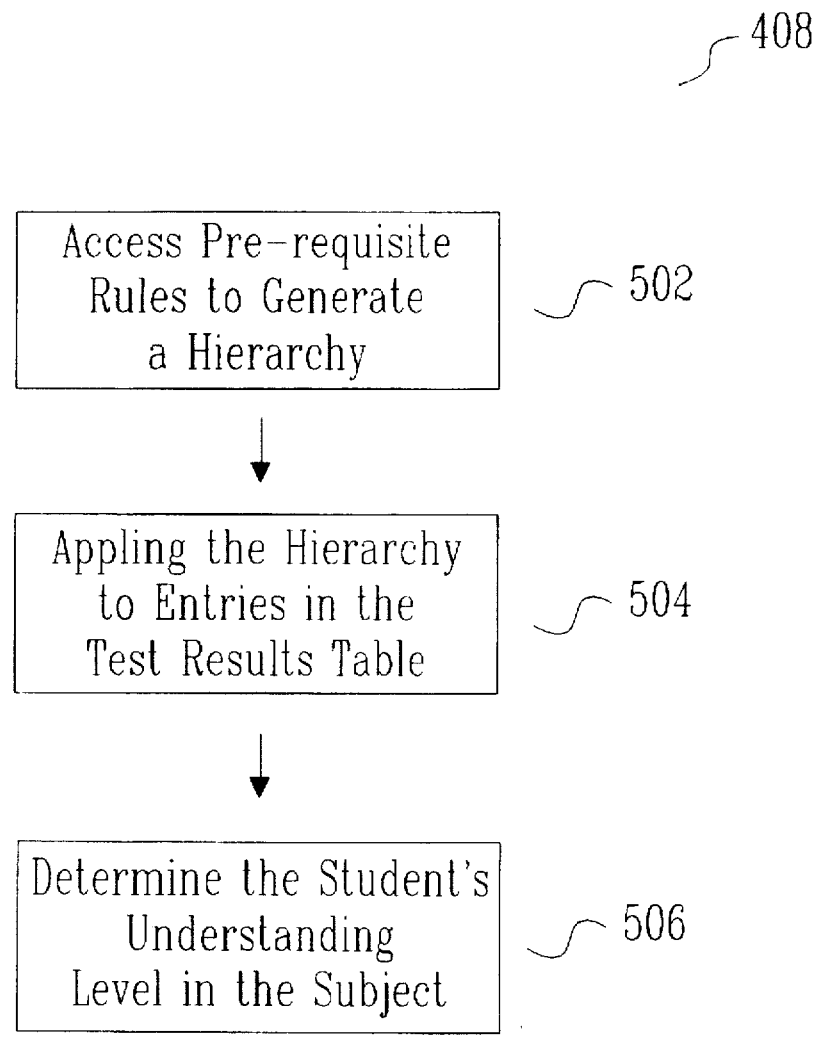
FIG. 7 shows one preferred set of steps for the prerequisite analyzer to generate recommendations for the student in the present invention.

FIG. 7 shows one preferred set of steps for the pre-requisite analyzer to generate 408' recommendations for the student. The analyzer accesses 502 the pre-requisite rules from the analysis-rule-storage medium to generate a complexity-hierarchy. The pre-requisite analyzer then applies 504 the hierarchy to entries in the test results table 250, such as the overall scores, to determine 506 the student's understanding level in the subject.

In one preferred embodiment, each rule includes a line-item and its pre-requisites; for example,

| Line-item | Pre-requisite |
|---|---|
| Frt +/− w/o comm denom | Frt +/− w/comm denom (7,B), & Frt +/− w/Int (8,C). |

The bracketed numeral and alphabet denote the difficulty level and the minimal grade required. In another preferred embodiment, there are two inherent pre-requisite rules:

(1) To reach a complexity level requires a passing grade of a lower complexity level unless the complexity level is at the lowest complexity level; and (2) Advancing to the next line-item starts at the lowest complexity level of that line-item.

The complexity-hierarchy describes the pre-requisites, and the grade or mastery that a student achieves for each pre-requisite before the student can advance to the next level of complexity. In order for the student to advance to a line-item, the student has to satisfy all of the pre-requisites of that line-item according to the complexity-hierarchy.

Figure 8:
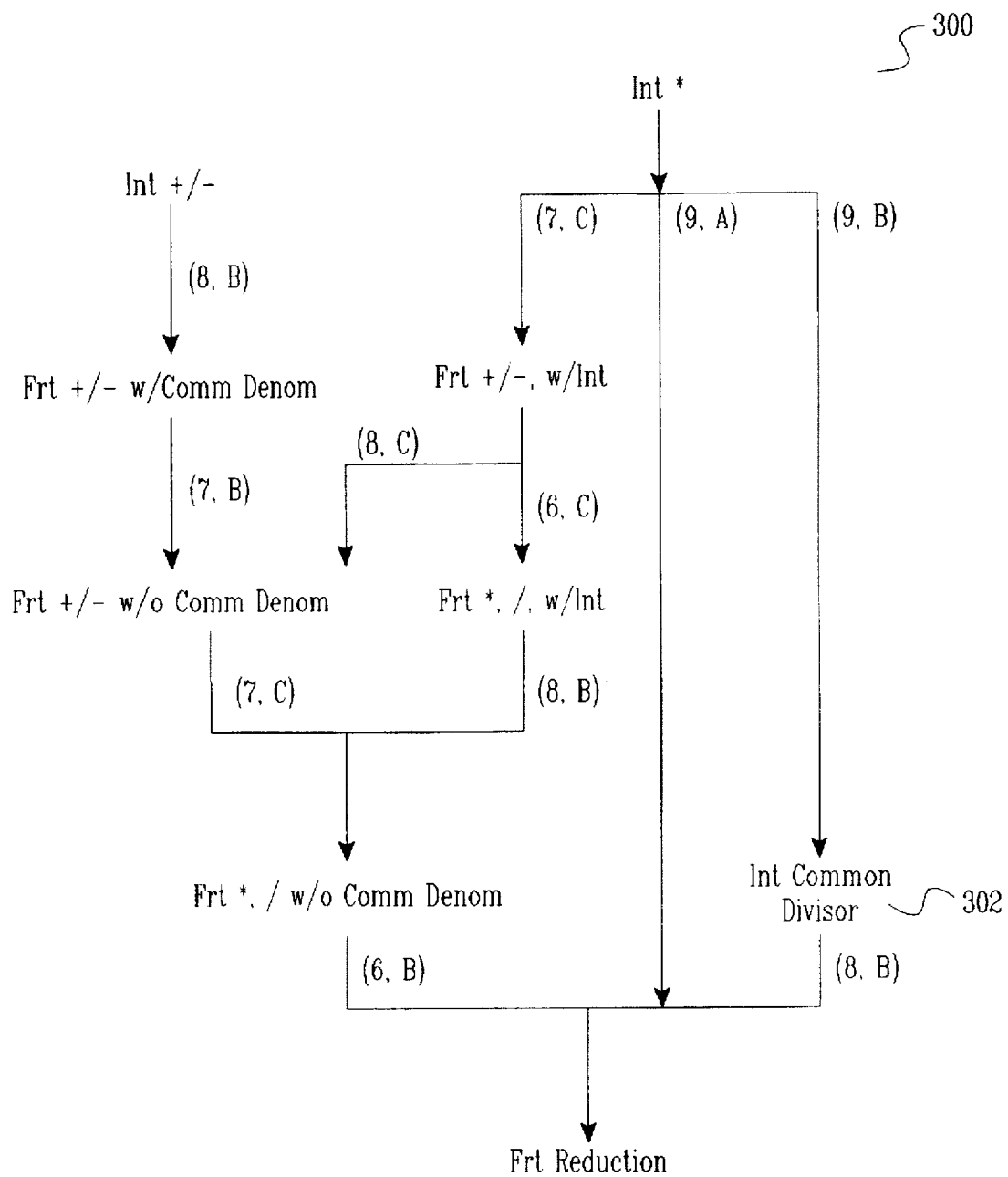
FIG. 8 shows an example of a hierarchy in the present invention.

FIG. 8 shows an example of such an hierarchy 300 with many nodes, where each node is a line-item, such as the node Int Common Divisor, 302. The nodes are interconnected to form the hierarchy.

In one preferred embodiment, moving up the hierarchy implies taking a test or working on a line-item that is harder. To move up the complexity-hierarchy, such as to move to a certain complexity level in a line-item, the student has to satisfy all of the pre-requisites of that complexity level in the line-item. For example, the complexity-hierarchy indicates that one must have a B grade or better in int +/− (level 9) before one can take the test for the first level of fractional addition and subtraction with common denominator. A student has achieved an overall score of 98, or a grade A in int +/− at a complexity level of 9. Based on the student's overall score, the pre-requisite analyzer provides the following recommendation: Since the student has a grade A in int +/− (level 9), the student can take the test for or should work on the first level of fractional addition and subtraction.

There are a number of preferred ways to apply the complexity-hierarchy to the contents in the test results table, such as the overall scores. One preferred way is known as a depth-first search, in which the pre-requisite analyzer analyzes the nodes in the hierarchy, from the top-down, starting, for example, from the line-item with the highest complexity. At every node, the analyzer would test for satisfaction of all of its pre-requisites. At least the first node where all of its pre-requisites is satisfied will be recommended.

Another preferred way is known as a breadth-first search, in which the pre-requisite analyzer analyzes the nodes in the hierarchy, from the bottom-up, starting, for example, from the least complex line-item. The following programming steps describe such an approach:

```
Recommend_list: = { }; Recommendation list is initially empty
For each PRule
    ; A PRule is a pre-requisite rule, which includes, for example, a line
    ; item and its pre- requisites.
    Begin RLI: = { }; RLI = Recommended line-item. For the time being,
    it is empty.
    LI: = Line-item(PRule) ; LI = the Line-item of the PRule
    If student's overall score in the LI is good
    Then apply non-subject-specific rules to decide
        if LI should be recommended
        ; these rules will be described later in the specification
    Else If student's overall score in the LI is bad
        Then RLI := {LI}; recommend the line-item
        Else Begin; student has not attempted the line item
            PRS: = Pre-requisites(PRule)
                ;PRS = All pre-requisites in the PRule
            For each PR in PRS; PR = A pre-requisite for the line-item
                If PR is not satisfied
                    Then quit loop
                If all PR's are satisfied
                    Then RLI: = {LI}; Should work on this LI
        End
    Recommend_list: = Recommend_list + RLI
End
```

In the above program, any description in a line after the symbol ";" is a comment.

In another preferred embodiment, if at least one but not all pre-requisites of a pre-requisite rule is satisfied, the recommendation may include the line-items of the unsatisfied pre-requisites.

A further preferred embodiment to apply the complexity-hierarchy is through a direct transformation technique, such as using a table lookup, with each pre-requisite rule being a table entry, which contains a line-item and its pre-requisites.

Another preferred way to apply the complexity-hierarchy is based on formulae. For example, a prolog program with a set of Horn's clauses describes the complexity-hierarchy. Each pre-requisite rule is represented by a Horn's clause. A recommendation is determined by resolving the Horn's clauses.

Again the pre-requisite rules are based on expert knowledge on a subject. The way to generate the rules should be well known to the experts in the subject—the more knowledgeable the expert, the more complete the set of rules. Even though the rules may be incomplete, once the hierarchy is established, there will not be any conflicts in applying it.

Both the relationship rules and the pre-requisite rules can be enhanced by adding new rules or modifying the rules, as suggested, for example, by experts in the field, by new findings based on student results, by changes in the educational system or by changes in the educational trend. As an example, due to advances in the biological world, more line-items should be added into the subject biology. Thus, new rules and/or new levels in the hierarchy should be added accordingly.

The rules might have to be modified from time to time if the inter-relationship among them has changed. For example, in the subject of electrical engineering, if an expert has discovered a student with a better understanding in solid state physics (a major-topic) advances much faster in semiconductor fabrication technique (another major-topic), then solid state physics becomes a pre-requisite for semiconductor fabrication technique.

Also, the line-items in an hierarchy may be partially merged. One may not have to achieve an A at the highest level of a line-item before one can advance to another line-item. For example, one pre-requisite for antenna theory may be a decent understanding in electromagnetic theory. So a student only requires to achieve a grade B or above in level 5 of electromagnetic theory before he can work on antenna theory. However, for another student who wants to master microwave theory and technique, the present invention would require her to achieve a grade B or above in level 8 of electromagnetic theory.

In another preferred embodiment, the recommendation generator other than generating recommendations, also makes available the test results table at its output.

Report Generation

Figure 9:
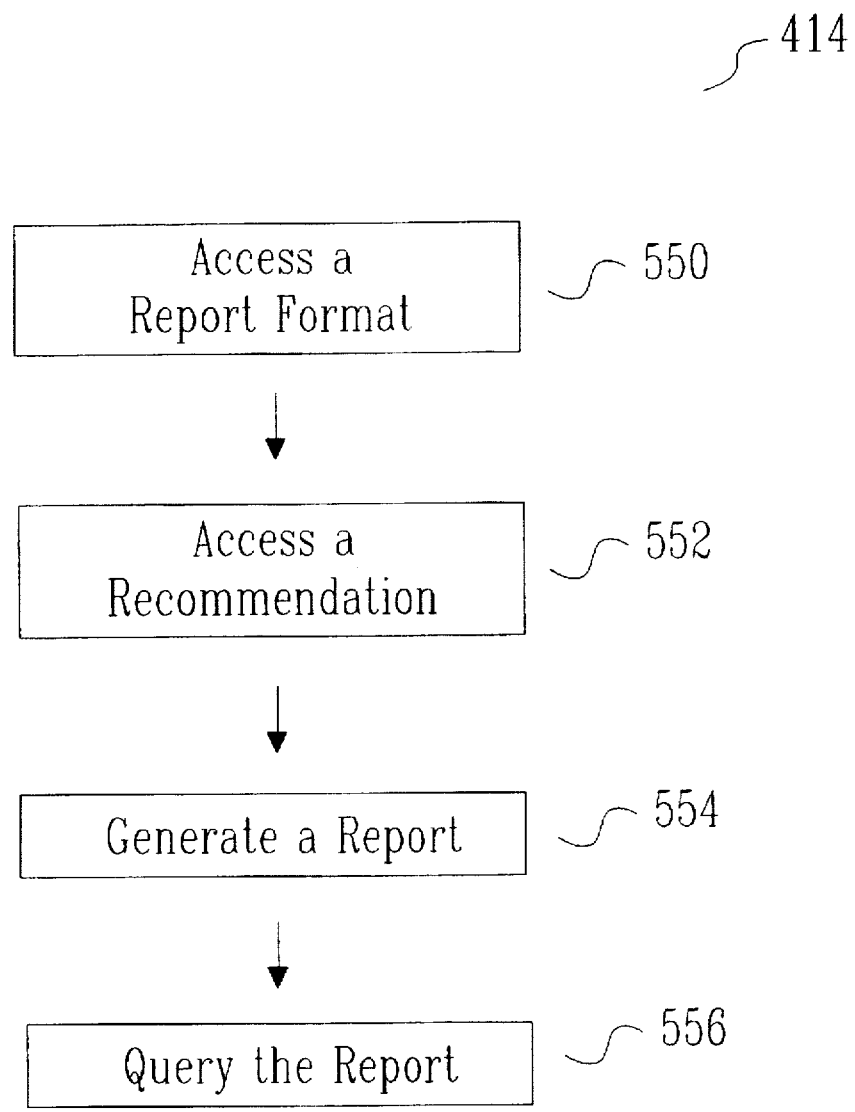
FIG. 9 shows one set of preferred steps to generate report by the report generator in the present invention.

FIG. 9 shows one set of preferred steps to generate report 414 by the report generator. First, the report generator accesses 552 a recommendation from the recommendation generator and accesses 550 a report format. Based on the accessed information, the report generator generates 554 a report for the student.

In one preferred embodiment, the recommendation includes one or more recommendation entries, with each entry denoting a line-item and the complexity level that the student should work on or the next set of questions should be in. One example of a recommendation entry is as follows:

(subject, major-topic, minor-topic, line-item, complexity).

In one embodiment, the report, based on the recommendations, provides an assessment of the student's strengths and weaknesses in different areas of the subject. The report may further provide action items indicating ways for the student to improve on the subject. For example, the report may suggest the student to spend more time on simple multiplication and division.

In one preferred embodiment, the report generator also extracts the student's identity from the test results table at the output of the recommendation generator. The report generator based on the student's identity, accesses the report format desired by the student from the report-storage medium 124. For example, the format can require printing the student's performance in each line-item of the latest test.

There are different preferred report formats. One format is the tabulation of (a) latest test scores and overall scores for different line-items based on the test results table. Another is the tabulation of (b) mastery levels or grade levels of line-items, minor-topics, major-topics and subject. The report format can also be a tabulation of (c) line-items to be studied for the next test. Another report format can be a tabulation of (d) weak and strong line-items, minor-topics, major-topics and subjects. Students are more likely to be interested in (a) to (c). Teachers are likely to be more interested in (b) and (d). Evaluators on the performance of the student are likely to be more interested in (a) and (b).

Note that the format does not have to be in a tabulated form. Other easy-to-digest formats are also preferred, such as showing the overall scores in each area of the latest test in graphical form or in a hierarchy.

In another preferred embodiment, the report is stored in the report-storage medium 124, which is coupled to a query processor 126. The query processor includes a query program to query 556 the report. The processor 126 can be accessed by students, teachers and evaluators, who can ask queries such as: What should I study for the next test; what are my weak subject areas; or did the student pass the test. The query program, based on the report, provides appropriate answers. Query programs are well-known in the art, and will not be further described in this application.

In yet another preferred embodiment, the query processor 126 with its query program is coupled to the report generator 110 to query the report generated.

Question Generator

The recommendation is accessed by the question generator. In one preferred embodiment, the recommendation includes a number of recommendation entries in the following format:

(subject, major-topic, minor-topic, line-item, complexity).

For each recommendation entry, in one preferred embodiment, the question generator 112 generates a number of questions.

There are a number of ways to generate questions for each recommendation entry. In one preferred embodiment, the question generator 112 accesses a fixed question table from a question-storage medium 120; in another preferred embodiment, the question generator 112 accesses a schema table from the question-storage medium 120. To generate a question, the question generator can select a question based on either the fixed question table or the schema table that matches the recommendation entry.

Fixed Question Table

In one preferred embodiment, the fixed question table contains a fixed set of question entries, each of which is of the following format:

(subject, major-topic, minor-topic, line-item, complexity, qid, qbody, answer), where qid is the identity of the question, which is a unique identifier for identifying the question; and qbody is the body of the question describing the question. In another preferred embodiment, the format does not have a separate qid attribute—the body of the question is used as the unique identifier. A number of examples of the fixed questions are shown in the following working embodiment.

Schema Table

In another preferred embodiment, the schema table contains a fixed set of question entries or schemata, each of which is of the following format:

(subject, major-topic, minor-topic, line-item, complexity, qid, qschema, arule, srule), where qschema is the question body with variables; srule specifies how the values of the variables are determined; and arule specifies how the answer is to be deduced after the values of the variables are determined. A number of examples are shown in the following working embodiment.

After selecting a question schema, the question generator 112 would apply the srule to replace all the variables in the question schema to generate the actual question body to be used in the test. The question generator then calculates the answer to that question body using the arule.

Figure 10:
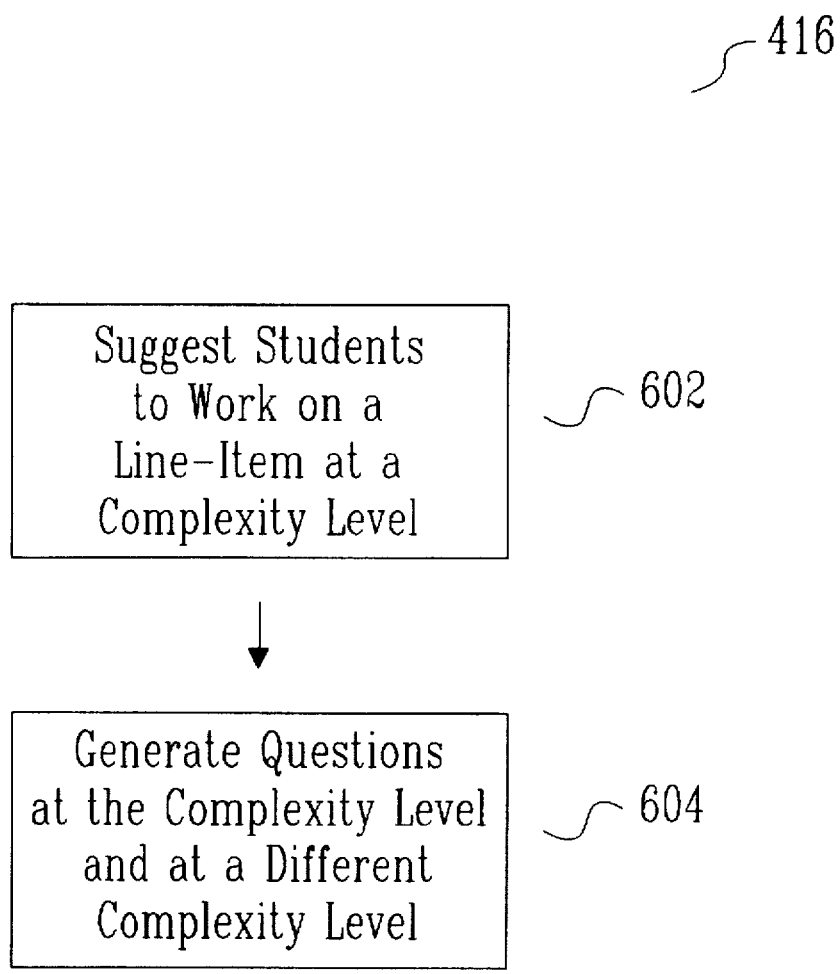
FIG. 10 shows one set of steps to generate questions by the question generator in the present invention.

Using either one of the two tables, the question generator selects questions according to the recommendation entries. In one preferred embodiment, as shown in FIG. 10, each recommendation entry suggests questions to be at a certain complexity, or suggests the student to work on a line item 602 at a complexity level. The question generator, following the recommendation, generates 604 N1 questions of the specified complexity (cm), N2 questions of a different complexity level. In another preferred embodiment, the different complexity is the next higher complexity level if cm is not the highest complexity level, and the embodiment further generates N3 questions of the previous lower complexity level if cm is not the lowest complexity level. For example, NI is a random number ranging from 2 to 5, with N2 and N3 also being random numbers chosen between 0 and N1. Thus, for each entry, the question generator, based on a known complexity level, automatically generates questions at that complexity level, and at higher and lower complexity levels. For these embodiments, the tests generated contain more than a single line-item.

In another preferred embodiment, to avoid repeating a question, the question generator 112 detects duplicates in the latest question set to be generated. Also, the question generator 112 accesses all of the questions the student has attempted from the tested-questions-storage medium 122, to ensure that there is no duplication with any previously generated questions. In yet another preferred embodiment, in testing duplicates with any previously generated questions, the question generator only considers questions previously generated within a certain time frame, such as within one year of the latest test, because, most probably, the student does not remember questions done more than a certain time frame away.

In one preferred embodiment, to avoid duplicates from questions selected based on the fixed question table, if the qid of the newly generated question matches that of a previously generated question, the question will not be selected.

In another preferred embodiment, for questions selected based on the schema table, to avoid duplicates, if the qid of the newly generated question matches a question in the newly generated test, the newly generated question would not be selected. This precaution does not analyze questions generated in all the previous tests.

Eventually a set of questions is generated for a future test to be given to the student. In one preferred embodiment, the set of questions generated is stored in the tested-question-storage medium 122 to facilitate the selection of the next set of questions, if required. In another preferred embodiment, only the qid of each question generated will be stored in the tested-question-storage medium 122.

Grading the Latest Test

After the student has taken a test consisting of the question bodies of the questions generated, grading can be done by conventional means. The finished test, which includes not just the answered questions, but also the student's identity and the time the test was taken, are sent to a reader, 128, which can be a computer. The reader 128 also receives the question entries from the question generator 112 to access the answers to the questions. Based on the question entries, the reader grades the finished test and generates the test results. In one preferred embodiment, the test results are in a table format, with one entry for one difficulty level of a line-item, such as the following:

(subject, major-topic, minor-topic, line-item, complexity, test score).

The test results together with some test information, such as the student's identity and the time the test was taken, are sent to the score generator 102. In another preferred embodiment, the test results and the test information are also sent to the test-result-storage-medium 113.

In another preferred embodiment, the invented educational system 100 includes the reader 128, which can be a computer with a scanner to scan in the student's finished test.

New Student

In the above description, for some embodiment, there is an assumption that the student's desired report format is in the report-storage medium and the student has taken tests administered by the system. However, if the student has not interacted with the system before, then in one preferred embodiment, the report generator first asks the student to enter his identification, his age and his desired report format. This can be done, for example, through the keyboard 226. Once entered, they are stored in the report-storage medium. If the student does not know what format he desires, one default report format may be to make available the student's performance in each complexity-level of each line-item in the test taken by the student.

In another preferred embodiment, the report-storage medium also includes a number of complexity levels for the subject. Each complexity level tracks the skill of average students at an age group. In one preferred embodiment, there are complexity levels covering age groups ranging from age 5 to age 65. Based on a student's age in the report-storage medium, the question generator, which is coupled to the report-storage medium, generates the first set of questions for the student, who has not interacted with the system before. The complexity level of this set of questions follows the skill level of average students at the student's age group. The same method can be applied to generate a set of questions for a student whose identity and age are in the system, but who has not taken any tests in a specific subject administered by the system.

Working Example

The invention will be further clarified by a consideration of the following examples, which are intended to be purely exemplary of using the invention.

The present invention can be applied to different subjects, for example, mathematics, English, history, geography, physics, chemistry and biology. In the present example, the invention is applied to mathematics.

Prior-to-the-latest Results

The system accesses a student's test results table on mathematics. Each table includes a general entry and many specific entries. The general entry includes the student's identity. Each specific entry in the table corresponds to a group of questions in a test, and has a list of attributes, such as:

(Subject, major-topic, minor-topic, line-item, . . . , degree-of-complexity, test score, time, overall-score).

The subject is mathematics. The following serves as examples of the major-topics, minor-topics and line-items:

---

Major Topics Under Mathematics

Calculus
Geometry
Trigonometry
.
.
.
High School Algebra (HSA)

Minor Topics Under High School Algebra
Decimal Numbers
Polynomials
Linear Equations
Quadratic Equations
.
.
.
Integers (Int)

Line Items Under Integers
Addition & Subtraction
Multiplication
Division
Prime Numbers
Factorization
Common Divisor
.
.
.
Fractions (Frt)

Line Items Under Fractions
Addition and Subtraction (+/−) with Common Denominator
+/− with Integers
+/− w/o Common Denominator
Multiplication and Divisions (*,/) with Integers
*,/ with fraction
Compound Fractions
Fraction Reduction
Ratios and Proportions
.
.
.

---

The degree of complexity ranges from 1 to 9 to represent the levels for the group of questions. The test score denotes the score received by the student in the test. The time denotes the time the test was administered. The overall-score denotes an overall performance percentage ranging from 0–100%.

One way to calculate the overall-score is form the average of all test scores for the line-item at the specific degree of complexity, such as:

Overall_score=(sum of all scores: prior-to-the-latest+ latest)/(number of tests).

Another calculation depends on a weighted combination of the latest test score and the prior-to-the-latest overall score, such as:

Overall_score=0.6*latest score+0.4*prior_to_the_latest_overall_score.

With the line item being Fractions, a number of entries can be as follows:

(Mathematics, HSA, Frt, +/− with comm denom., 1, 3/16/95, 95, 90).

(Mathematics, HSA, Frt, +/− with comm denom., 2, 4/16/95, 98, 86).

(Mathematics, HSA, Frt, +/− with comm denom., 3, 5/16/95, 87, 75).

(Mathematics, HSA, Frt, +/− w/o comm denom., 1, 6/16/95, 75, 78).

(Mathematics, HSA, Frt, +/− w/o comm denom., 2, 7/16/95, 70, 67).

(Mathematics, HSA, Frt, +/− W/o comm denom., 3, 8/16/95, 65, 70).

Analysis Rules

Relationship Rules

Some examples are as follows, with "GR" denoting a grade, and "P" denoting pass.

Complex: (Subject, major-topic, minor-topic, line-item, complexity, condition)→GR (Math, HSA, Int, +/−, 9, overall-score>=90)→P. (Math, HSA, Int, *, 9, 75<= overall_$_{score<}$90)→B. (Math, HSA, Int, factorization, 9, overall_$_{score>}$90)→A.

Line Item: (Subject, major-topic, minor-topic, line-item, condition)→GR. (Math, HSA, Int, factorization, "level 9 pass")→A. (Math, HSA, Int, factorization, "level 8 pass") →B. (Math, HSA, Int, factorization, "level 7 pass")→C. (Math, HSA, Int, factorization, "level 6 pass")→D. (Math, HSA, Int, factorization, "level 7 pass")→P.

Minor-Topic: (Subject, major-topic, minor-topic, condition) →GR. (Math, HSA, Int, "Pass all line items excluding factorization")→P. (Math, HSA, Frt, "Pass all line items excluding ratios & proportions")→P.

Major-Topic: (Subject, major-topic, condition)→GR. (Math, HSA, "Pass all minor-topics with 80% in A")→A. (Math, HSA, "Pass all minor-topics with B or better")→B. (Math, HSA, "Pass 45% of all minor-topics")→D. P0

Subject: (Subject, condition)→GR. (Math, "Pass 75% of all major-topics")→C.

Complexity-Hierarchy

FIG. 4 shows a complexity-hierarchy for fractional reduction in the form of a hierarchy diagram. Based on the figure, in order to take the tests for Frt reduction, one has to achieve a grade B at the sixth level for fractional multiplication and division without common denomination (Frt *,/w/o comm denom), a grade of B at the eighth level for tests for Int. common divisor, and a grade of A at the difficulty level of nine for integer multiplication. To take the tests for Frt *,/w/o comm denom, one has to achieve a grade C at the seventh level for Frt +/− w/o comm denom, and a grade B at the eighth level of Frt *,/w/Int.

Question Generation

Fixed Questions

The following examples are for fixed questions with the format for the question entry being:

---

(Subject, major-topic, minor-topic, line-item, complexity, qid, qbody, answer).
Subject: Mathematics.
Major-topic: High School Algebra.
Minor-topic: Fraction.
Line-item: Fraction +/− with common denominator or
(Frt +/− w/ comm denom)

| Comp. | Qid | Ans. | Qbody |
|---|---|---|---|
| 3 | 81 | 28/37 | What is the sum of 2/37, 3/37, 8/37 and 15/37? |
| 3 | 261 | −2/43 | 17/43 − 25/43 + 6/43 = ? |

Line-item: Fraction *,/ or (Frt *,/)

| Comp. | Qid | Ans. | Qbody |
|---|---|---|---|
| 5 | 214 | −12.5% | A supermarket increased the price of orange juice by 25% in the summer. During fall, it had a sale and |

-continued

```
               reduced the price of orange juice
               by 30%. What was the net change in price?
```

Schema Questions

The following examples are for schema questions with the format for the question entry being:

```
(Subject, major-topic, minor-topic, line-item, complexity,
qid, qschema, srule, arule)
Subject: Mathematics.
Major-topic: High School Algebra.
Minor-topic: Fraction.
Line-item: Frt +/- w/ comm denom.
Comp.   Qid     Qschema 3       81      What is the sum of x1/y, x2/y, x3/y and x4/y?
        srule:  y = random (25, 99), which means a
                number randomly chosen
                between 25 and 99.
                x1 = random (4,49); x2 = random (4,49);
                x3 = random (4,49); and
                x4 = random (4,49).
        arule:  answer = x1/y + x2/y +
                x3/y + x4/y.
3       127     x1/y - x2/y + x3/y = ?
        srule:  y = random (25,99); x1 = random (4,49);
                x2 = random (4,49);
                and x3 = random (4,49).
        arule:  answer = x1/y - x2/y + x3/y.

Line-item: Frt *,/
Comp    Qid     Qschema 5       214     A supermarket increased the price of
                orange juice by x% in the
                summer. During fall, it had a sale
                and reduced the price of orange
                juice by y%. What was the net change in price?
        srule:  x = random (10,30); and y = x + 10.
        arule:  answer = (1 + x/100)*(1 - y/100) - 1
```

Conclusion

Note that accessing in the present invention can be as simple as just acknowledging the receipt of data from a transmitting source.

In a preferred embodiment, two line-items may cover the same areas but different levels of complexity in a subject. For example, one line-item covers complexity levels 1 to 4 of addition/subtraction; and another line-item covers complexity levels 5–8 of addition/subtraction. In another preferred embodiment, a line-item has only one complexity level.

The subject in the present invention is also very broadly defined. Different subjects that have relationship can be combined into one subject in the present invention. For example, physics, chemistry and biology can be combined into the subject called science.

In another preferred embodiment, the score generator only accesses the latest test results, but not the prior-to-the-latest test results. The test scores in the latest test results are accessed by the recommendation generator, which also accesses a set of analysis-rule to analyze the test scores. Based on the analysis, the recommendation generator generates recommendations for the student, such as the line-item that should be improved, or the line-item that should be studied next or the area in the subject that the student is weak.

The weight for an overall score that reflects the student's degree of forgetfulness does not have to be a constant number for all students and for all tests. In one preferred embodiment, the weight depends on whether the student is handicapped in that subject as compared to other students. For example, the subject is English; then the weight for a student with English as a second language is larger than that for a student with English being his native language. This is because for the student with English as a second language, he is on a steeper learning curve in learning English than the student with English as his native language. Thus, for the non-native-speaker, the latest test should be more emphasized. Such an implementation requires the educational system 100 to have access to some of the student's personal information, such as his ethnic group, country of birth, sex, educational level, geography location and school district, so as to decide what weight to use. In one preferred embodiment, when the report generator 110 asks for the student's report format, such personal information is also asked for. After they are entered, they are stored in the report storage medium, and are transferred to the score generator as part of the test information.

In another preferred embodiment, the weight depends on the subject. A subject that emphasizes on concept, such as physics, tends to favor the prior-to-the-latest results. This is to ensure fundamental understanding, and it implies that the weight on the prior-to-the-latest results should be larger. On the other hand, a subject that emphasizes on skill, such as conversation skill, tends to favor latest results; it implies that the weight for the latest test results should be larger.

In the present invention, the score generator accesses test results to calculate overall scores for the recommendation generator. In another preferred embodiment, the score generator just accesses two or more most recent test results for the recommendation generator. The recommendation generator analyzes the accessed test results by a set of analysis rules to come up with recommendations. Thus, in this embodiment, the score generator does not calculate overall scores, and the rules in the recommendation generator directly operate on the test scores. In one example, these operations are based on if-then-else else statements, such as if one recent test score in a certain area is of such a grade, and another recent test score in another area is of such a grade, then the student is strong in a certain minor-topic.

The present invention describes the score generator accessing not only test results, but also test information. In another preferred embodiment, the test information is included in the test results. For example, the student's identity and the time a test was taken are included in the test results. In another embodiment, the report storage includes a default report format to generate reports. In yet another preferred embodiment, the system 100 is for the use of one specific student. With the student's identity fixed, no student identity is required to be transmitted to the score generator.

In another preferred embodiment, the pre-requisite analyzer does not generate a hierarchy; it accesses the pre-requisite rules and applies them directly to the test results table to generate recommendations for the student. The hierarchy is a representation for the pre-requisite rules, and is not a necessity for the rules to be applied to the test results table.

In the present invention, the different rules do not have to separately reside in a storage medium to be accessed by a program. In one preferred embodiment, the rules can be embedded in one or more programs, such as prolog programs or an object-oriented database. In such an embodiment, accessing the rules is similar to querying those programs. Once the rules are known, to implement such programs should be obvious to those skilled in the art.

In another preferred embodiment, one or more of the components, such as the recommendation generator, can be implemented on a circuit, such as a field-programmable-gate-array, where the entire program embodying one or more of the components are burnt into the circuit.

In yet another preferred embodiment, the present invention is implemented through an object oriented program, with each component as an object. For example, the score generator is an object, and the recommendation generator is another object.

In the present invention, the analysis rules have been described to be subject specific. In another preferred embodiment, some of the analysis rules are non-subject specific. They can be applied to all subjects. Some examples of such rules are as follows:

Consecutively failing a line item twice→
Re-test that line-item's pre-requisites.
Consistently scoring poorly in a line item→
Re-test that line-item's pre-requisites.
Passing a line-item at a grade of A→No need to re-test.

Also, in the present invention for the sake of simplicity, the recommendation generator, the question generator and the report generator receive the test results table. However, the information in the table does not have to be tabulated. Also the three generators do not have to access the entire table, but only have to access the required information in the table.

The present invention repeatedly uses terms such as latest and prior-to-the-latest. In another preferred embodiment, the present invention is also applicable to situations when (events happened prior-to-the-latest) is replaced by (events happened prior to those events), and latest is replaced by prior-to-the-latest.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. An educational system for assessing a student's understanding in a subject, the system, using latest test results from the latest test taken by the student and the prior-to-the-latest test results, comprising:

a score generator for accessing the student's prior-to-the-latest test results and the latest test results; and a recommendation generator coupled to the score generator for:

accessing a set of analysis rules, with a plurality of the rules being subject-specific; and analyzing the student's prior-to-the-latest and the latest test results using the set of rules to generate a recommendation, which provides an assessment on the student's understanding in the subject.

2. A system as recited in claim 1 further comprising:

a student's-result-storage medium coupled to the score generator for storing the student's test results; and an analysis-rule-storage medium coupled to the recommendation generator for storing the set of analysis rules.

3. An educational system as recited in claim 1 wherein the score generator also accesses the time that each test was taken, and generates an overall score based on the accessed information;

such that the overall score reflects the student's degree of forgetfulness in the subject as a function of time.

4. An educational system as recited in claim 3 wherein:

the subject is divided into line-items with at least one line-item being more difficult than another line-item;

the latest test includes questions with different line-items; and the score generator generates an overall score for each group of questions having the same line-item;

such that the overall score for each group of questions reflects the student's degree of forgetfulness in that group of questions as a function of time.

5. An educational system as recited in claim 3 wherein:

the student's prior-to-the-latest test results are weighted differently as compared to the latest test results to generate the overall score; and the weight depends on whether the student has any handicap in that subject as compared to other students.

6. An educational system as recited in claim 3 wherein:

the student's prior-to-the-latest test results are weighted differently as compared to the latest test results to generate the overall score; and the weight depends on the whether the subject emphasizes on fundamental understanding.

7. An educational system as recited in claim 1 wherein the recommendation generator resolves conflict among one or more rules and the latest test results in order to provide a consistent assessment of the student's understanding in the subject.

8. An educational system as recited in claim 7 wherein the recommendation generator further resolves conflict among two or more rules in order to provide a consistent assessment of the student's understanding in the subject.

9. An educational system as recited in claim 7 wherein the recommendation generator disables the one or more rules that are in conflict with the latest test results.

10. An educational system as recited in claim 7 wherein the recommendation generator reshuffles the order of application of the rules that are in conflict with the latest test results to resolve the conflict.

11. An educational system as recited in claim 7 wherein:

each rule is associated with a credit;

every time the rule is applied to generate a recommendation and there is no conflict with the test results, the credit for that rule will be increased by an amount;

every time the rule is applied and there is a conflict, the credit for that rule will be decreased by another amount; and a rule with a higher credit is applied before a rule with a lower credit.

12. An educational system as recited in claim 7 wherein the recommendation generator resolves the conflict by generating a new rule, which would be applied before the one or more conflicting rules so as to resolve the conflict.

13. An educational system as recited in claim 1 wherein:

the subject is divided into line-items with at least one line-item being more difficult than another line-item; and the analysis rules are pre-requisite rules, which, based on the complexity levels of the line-items, establish a complexity-hierarchy among the line-items; and the recommendation generator is a pre-requisite analyzer, which determines the student's level of understanding in each line-item in at least one test by applying the complexity-hierarchy on the overall scores in at least that test.

14. An educational system as recited in claim 13 wherein for the student to advance to a line-item, the student has to satisfy all of the pre-requisites of that line-item according to the complexity-hierarchy.

15. An educational system as recited in claim 1 wherein:

the subject is divided into line-items with at least one line-item being more difficult than another line-item;

the tests include questions from a plurality of line-items;

the score generator based on the latest and the prior-to-the-latest test results generates an overall score for each line-item in the latest test;

the analysis rules are a set of relationship rules, which determine the relationship among the line-items; and the recommendation generator is an inference engine, which determines the student's level of understanding in each line-item in at least one test by applying the set of relationship rules on the overall scores in at least that test.

16. An educational system as recited in claim 1 wherein:

the subject is divided into line-items with at least one line-item being more difficult than another line-item;

the tests include questions from a plurality of line-items; and the system further comprises a report generator coupled to the recommendation generator for accessing a report format; and generating a report, based on the recommendation and the report format so that the report can provide assessment of the student's understanding in each line-item in the tests.

17. An educational system as recited in claim 16 wherein based on the recommendation, the report suggests action items for the student to take to improve on the student's understanding in the subject.

18. An educational system as recited in claim 16 further comprising a query processor coupled to the report generator for querying the report.

19. An educational system as recited in claim 1 wherein:

the subject is divided into line-items with at least one line-item being more difficult than another line-item;

the recommendation generator recommends the student to work on a line-item; and the system further comprises a question generator coupled to the recommendation generator for generating a plurality of questions, which can be categorized into at least two line-items, one being the one suggested by the recommendation, a second being different from the one suggested by the recommendation generator.

20. An educational system as recited in claim 19 wherein the second line-item is further split into two line-items:

one being more difficult than the one suggested by the recommendation, unless the suggested line-item is the line-item at the highest complexity level of the subject; and the other being less difficult than the one suggested by the recommendation, unless the suggested line-item is the line-item at the lowest complexity level of the subject.

21. An educational system as recited in claim 19 wherein the question generator further prevents duplication in questions previously generated by the system within a preset time from the recently generated questions through comparing every recently generated question with all questions previously generated within the preset time.

22. An educational system as recited in claim 1 wherein the question generator further prevents duplication in questions previously generated by the system from the recently generated questions through comparing every recently generated question with all questions previously generated.

23. An educational system for assessing a student's understanding in a subject, which is divided into line-items, with at least one line-item being more difficult than another line-item, the system using the latest test results from the latest test taken by the student, the latest test including questions from a plurality of line item, the system comprising:

a score generator for accessing the student's prior-to-the-latest test results, the latest test results, and the time that each test was taken to generate an overall score for each set of questions that belongs to the same line-item, such that each overall score reflects the student's degree of forgetfulness as a function of time for that group of questions;

an inference engine coupled to the score generator for:

accessing a set of relationship rules, that define relationship among the line-items;

determining the student's level of understanding in each line-item in the latest test by applying the set of relationship rules on the overall scores;

providing recommendation, which at least suggests to the student to work on one line-item;

resolving conflict among one or more relationship rules with the overall scores, and conflict among two or more rules, if there is a conflict, so as to provide a consistent assessment of the student's understanding in the subject;

a report generator coupled to the inference engine for:

accessing a report format; and generating a report, based on the recommendation and the report format so that the report can provide assessment of the student's understanding in each line-item of the latest test; and a question generator coupled to the inference engine for generating a plurality of questions, which can be categorized into at least two complexity levels-one line-item being the one suggested by the recommendation, and a second line-item being different from the one suggested by the recommendation.

24. An educational system for assessing a student's understanding in a subject, using the latest test results from the latest test taken by the student, the system comprising:

a test-results-storage medium for storing the student's test results; and a score generator:

for accessing the student's latest test results;

for accessing the time that each test was taken;

coupled to the storage medium for accessing the student's prior-to-the-latest test results; and for generating an overall score based on the accessed information;

such that the overall score reflects the student's degree of forgetfulness in the subject as a function of time.

25. An educational system as recited in claim 24 wherein:

the subject is divided into line-items with at least one line-item being more difficult than another line-item;

the latest test includes questions with different line-items; and the score generator generates an overall score for each group of questions having the same line-item;

such that the overall score for each group of questions reflects the student's degree of forgetfulness in that group of questions as a function of time.

26. An educational system as recited in claim 24 wherein the latest test results with the overall score is stored in the test-results-storage medium.

27. An educational system as recited in claim 24 wherein:
the student's prior-to-the-latest test results are weighted differently as compared to the latest test results to generate the overall score; and
the weight depends on whether the student has any handicap in that subject as compared to other students.

28. An educational system as recited in claim 24 wherein:
the student's prior-to-the-latest test results are weighted differently as compared to the latest test results to generate the overall score; and
the weight depends on the whether the subject emphasizes on fundamental understanding.

29. An educational system for assessing a student's understanding in a subject, the system, using the latest test results from the latest test taken by the student, comprising:
an analysis-rules-storage medium for storing a set of relationship rules; and
a recommendation generator coupled to the analysis-rules-storage medium for:
accessing the set of relationship rules from the analysis-rule-storage medium;
analyzing the student's latest test results using the rules to generate a recommendation; and
resolving conflict among one or more rules and the latest test results in order to provide a consistent assessment of the student's understanding in the subject.

30. An educational system as recited in claim 29 wherein the recommendation also depends on the prior-to-the latest test results.

31. An educational system as recited in claim 29 wherein the recommendation generator further resolves conflict among two or more rules in order to provide a consistent assessment of the student's understanding in the subject.

32. An educational system as recited in claim 29 wherein the recommendation generator disables the one or more rules that are in conflict with the latest test results.

33. An educational system as recited in claim 29 wherein the recommendation generator reshuffles the order of application of the rules that are in conflict with the latest test results to resolve the conflict.

34. An educational system as recited in claim 29 wherein:
each rule is associated with a credit;
every time the rule is applied to generate a recommendation and there is no conflict with the test results, the credit for that rule will be increased by an amount;
every time the rule is applied and there is a conflict, the credit for that rule will be decreased by another amount; and
a rule with a higher credit is applied to analyze test results before a rule with a lower credit.

35. An educational system as recited in claim 29 wherein the recommendation generator resolves the conflict by generating a new rule, which would be applied before the one or more conflicting rules so as to resolve the conflict.

36. An educational system for assessing a student's understanding in a subject, which is divided into line-items with at least one line-item being more difficult than another line-item, the system, using the latest test results from at least one test taken by the student, comprising:
a score generator accessing the student's latest test results to generate overall scores; and
a pre-requisite analyzer coupled to the score generator for
accessing pre-requisite rules, which, based on the complexity levels of the line-items, establish a complexity-hierarchy among the line-items; and
determining the student's level of understanding in each line-item in the latest test by applying the complexity-hierarchy on the overall scores.

37. An educational system as recited in claim 36 wherein the overall scores also depend on the student's prior-to-the-latest test results.

38. An educational system as recited in claim 36 wherein the pre-requisite analyzer generates recommendation for the student based on the determined student's level of understanding;
such that the recommendation provides an assessment on the student's understanding in the subject.

39. An educational system as recited in claim 36 further comprising an analysis-rule-storage medium for storing the pre-requisite rules.

40. An educational system as recited in claim 38 wherein for the student to advance to a line-item, the student has to satisfy all of the pre-requisites of that line-item according to the complexity-hierarchy.

41. An educational system for assessing a student's understanding in a subject, which is divided into line-items with at least one line-item being more difficult than another line-item, using tests with a plurality of line-items taken by the student, the system comprising:
a score generator accessing the student's latest test results to generate one or more overall scores for the corresponding one or more line-items in the latest test; and
an inference engine coupled to the score generator for
accessing a set of relationship rules, which determine the relationship among the line-items; and
determining the student's level of understanding in the one or more line-items in the latest test by applying the set of relationship rules on the corresponding one or more overall scores in the latest test.

42. An educational system as recited in claim 41 wherein the inference engine generates recommendation for the student based on the determined student's level of understanding;
such that the recommendation provides an assessment on the student's understanding in the subject.

43. An educational system as recited in claim 41 further comprising an analysis-rule-storage medium for storing the relationship rules.

44. An educational system as recited in claim 41 wherein the overall scores also depend on the student's prior-to-the-latest test results.

45. An educational system for assessing a student's understanding in a subject, which is divided into the line-items with at least one line-item being more difficult than another line-item, the system using the latest test results from the latest test taken by the student, the latest test including questions from more than one line-item, the system comprising:
a report-storage medium for storing a report format; and
a report generator coupled to the report-storage medium for
accessing the report format;
accessing a recommendation, which is based on the latest test results; and
generating a report, based on the recommendation and the report format so that the report can provide assessment of the student's understanding in each line-item in the latest test.

46. An educational system as recited in claim 45 wherein the recommendation is also based on the student's prior-to-the-latest test results.

47. An educational system as recited in claim 45 wherein based on the recommendation, the report suggests action items for the student to take to improve on the student's understanding in the subject.

48. An educational system as recited in claim 45 further comprising a query processor coupled to the report generator for querying the report.

49. An educational system as recited in claim 47 further comprising a query processor coupled to the report generator for querying the report.

50. An educational system for assessing a student's understanding in a subject, which is divided into line-items with at least one line-item being more difficult than another line-item, the system comprising:

a recommendation generator recommending the student to work on a line-item; and a question generator coupled to the recommendation generator for generating a plurality of questions, which can be categorized into at least two line-items, one being the one suggested by the recommendation, a second being different from the one suggested by the recommendation generator.

51. An educational system as recited in claim 50 wherein the second line-item is further split into two line-item:

one being more difficult than the one suggested by the recommendation, unless the suggested line-item is the line-item at the highest complexity level of the subject; and the other being less difficult than the one suggested by the recommendation, unless the suggested line-item is the line-item at the lowest complexity level of the subject.

52. An educational system as recited in claim 50 where in the question generator further prevents duplication in questions previously generated by the system within a preset time from the recently generated questions through comparing every recently generated question with all questions previously generated within the preset time.

53. An educational system as recited in claim 50 wherein the question generator further prevents duplication in questions previously generated by the system from the recently generated questions through comparing every recently generated question with all questions previously generated.

54. An educational system for assessing a student's understanding in a subject, which is divided into line-items with at least one line-item more difficult than another line-item, the system, using latest test results from the latest test taken by the student, comprising:

a score generator for accessing the student's latest test results; and a recommendation generator coupled to the score generator for:

accessing a set of analysis rules, with a plurality of the rules being subject-specific; and analyzing the student's latest test results using the set of rules to generate a recommendation, which provides an assessment on the student's understanding in the subject;

such that the recommendation includes suggesting to the student the line-item that the student should improve on.

55. A system as recited in claim 53 further comprising:

a student's-result-storage medium coupled to the score generator for storing the student's test results;

an analysis-rule-storage medium coupled to the recommendation generator for storing the set of analysis rules; and wherein the recommendation also suggests to the student the line-item that the student should study next.

* * * * *

UNITED STATES PATENT AND TRADEMARK OFFICE
CERTIFICATE OF CORRECTION

PATENT NO. : 5,779,486 Page 1 of 1
DATED : July 14, 1998
INVENTOR(S) : Ho et al.

It is certified that error appears in the above-identified patent and that said Letters Patent is hereby corrected as shown below:

Column 21,
Line 66, change "as recited in claim 1" to -- as recited in claim 19 --.

Column 26,
Line 28, change "as recited in claim 53" to -- as recited in claim 54 --.

Signed and Sealed this

Twenty-fourth Day of August, 2004

JON W. DUDAS
*Director of the United States Patent and Trademark Office*